United States Patent [19]

Fukuda

[11] 4,306,446

[45] Dec. 22, 1981

[54] APPARATUS FOR ESTIMATING LOCALITY OF LEAKING SPOT IN PIPELINE

[75] Inventor: Toshio Fukuda, Tokyo, Japan

[73] Assignee: Agency of Industrial Science & Technology, Tokyo, Japan

[21] Appl. No.: 129,842

[22] Filed: Mar. 13, 1980

[30] Foreign Application Priority Data

Jun. 11, 1979 [JP] Japan .................. 54-73209

[51] Int. Cl.³ .............................................. G01M 3/28
[52] U.S. Cl. .................................................. 73/40.5 R
[58] Field of Search ..................................... 73/40.5 R

[56] References Cited

U.S. PATENT DOCUMENTS

| | | | |
|---|---|---|---|
| 3,667,285 | 6/1972 | Wright et al | 73/40.5 R |
| 3,690,150 | 9/1972 | Mullen | 73/40.5 R |
| 3,884,077 | 5/1975 | Athy, Jr. | 73/40.5 R X |
| 4,012,944 | 3/1977 | Covington et al. | 73/40.5 R |
| 4,198,855 | 4/1980 | Tsujikura | 73/40.5 R |

Primary Examiner—Gerald Goldberg
Assistant Examiner—Joseph W. Roskos
Attorney, Agent, or Firm—Haight, Rosfeld & Noble

[57] ABSTRACT

An apparatus for estimating the locality of a leaking spot in a pipeline which conveys a fluid, the apparatus comprising: a pair of detectors located on the pipeline at positions spaced from each other by a certain distance l and adapted to detect pressures $P_1$ and $P_2$ and pressure gradients $\partial \bar{P}_1/\partial x$ and $\partial \bar{P}_2/\partial x$ at the respective positions; and an operating unit adapted to calculate the locality of a leaking spot on the basis of the pressure gradients $\partial P_1/\partial x$ and $\partial P_2/\partial x$ and mean pressures $\bar{P}_1$ and $\bar{P}_2$ as obtained by memory-holding the pressures $P_1$ and $P_2$, by an operation of $$\frac{\hat{x}}{l} = \frac{\bar{P}_2^{2(n-1)} a_{22} - \bar{P}_1^{n-1} \bar{P}_2^{n-1} a_{12}}{\bar{P}_1^{2(n-1)} a_{11} - 2\bar{P}_1^{n-1} \bar{P}_2^{n-1} a_{12} + \bar{P}_2^{2(n-1)} a_{22}}$$

wherein $$a_{ij} = E\left\{ \frac{\partial \tilde{P}i}{\partial x} \cdot \frac{\partial \tilde{P}j}{\partial x} \right\} \quad (i,j = 1, 2)$$

E: estimated value
$\hat{x}$: distance from upstream detector to leaking spot
n: pressure drop index number (n=1 for liquid, n=2 for isothermal gas and 1<n<2 for gas-liquid mixture which is determined experimentally depending upon the gas-liquid mixture ratio).

1 Claim, 5 Drawing Figures

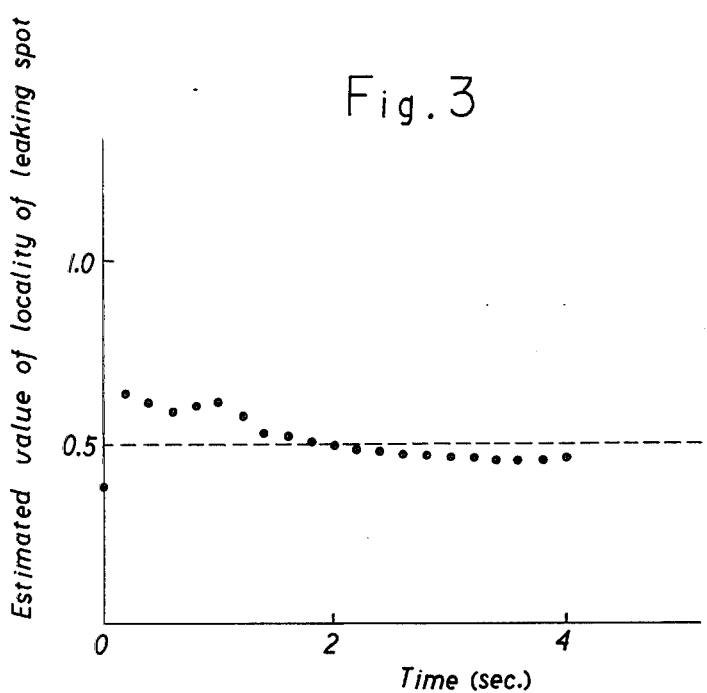
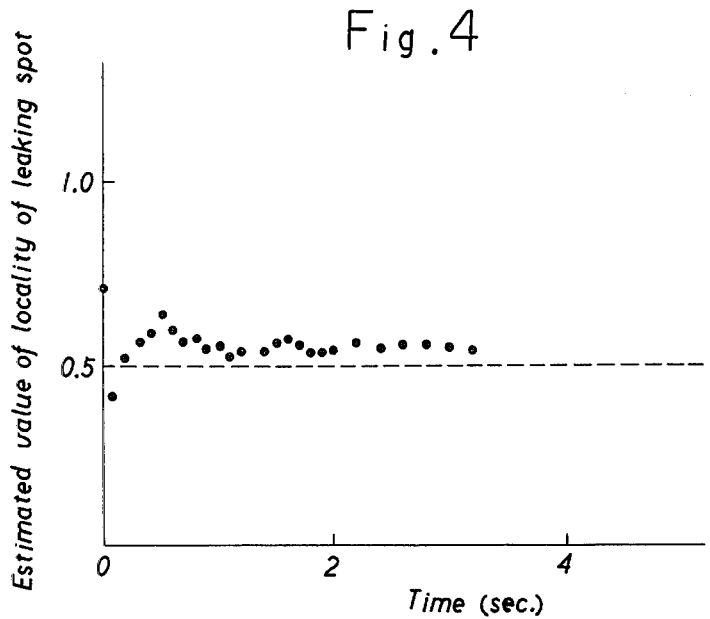

APPARATUS FOR ESTIMATING LOCALITY OF LEAKING SPOT IN PIPELINE

BACKGROUND OF THE INVENTION

This invention relates to an apparatus for estimating the locality of a leaking spot in a pipeline conveying a liquid phase, gas phase and gas-liquid two phase fluids.

Leaks in a pipeline, for example, in a petroleum pipeline invite not only losses in productivity but also destruction of environment particularly in the case of a submarine pipeline. Similar problems are brought about by leaks in other various pipelines. In any case, it is necessary to detect the leaks as soon as possible in the first step and to estimate the locations of leaks in the second step in order to take appropriate measures.

For this purpose, there have been proposed various methods, including a method of, after detecting existence of a leak in the first step, estimating the locality of the leak by averaging operation based on pressure gradients and mean pressures (V. H. Siebert, R. Iserman, "Leckerkennung und -lokalisierung bei Pipelinens druch on-line-Korrelation mit einem Prozessrechner", Regelungstechnik, Heft 3, Seite 69–74, (1977)).

However, the estimation of the localities of leakage by the averaging operation has been found unsatisfactory in accuracy and applicable only to pipelines for liquids.

SUMMARY OF THE INVENTION

With the foregoing in view, it has been experimentally confirmed that, in estimating the locality of a leaking spot in a pipeline, a correlative operation is extremely effective for taking into account the compressibility of the fluid containing gas phase and eliminating the influences of irregular fluctuations in pressure gradient.

Therefore, it is an object of the present invention to provide an apparatus which is capable of accurately estimating the locality of a leak in a pipeline in a simple and easy manner by a correlative operation based on pressure gradients and mean pressures.

It is another object of the present invention to provide an apparatus which is capable of estimating the locality of a leak in a pipeline no matter whether the fluid conveyed by the pipeline is a non-compressed liquid phase fluid or a compressed gas-liquid mixture.

According to the present invention, there is provided an apparatus for estimating the location of a leak in a pipeline, comprising: a pair of detectors located on the pipeline at positions spaced from each other by a certain distance $l$ and adapted to detect pressures $P_1$ and $P_2$ and pressure gradients $\partial \bar{P}_1/\partial x$ and $\partial \bar{P}_2/\partial x$ at the respective position; and an operating unit adapted to calculate the locality of a leaking spot on the basis of the pressure gradients $\partial \bar{P}_1/\partial x$ and $\partial \bar{P}_2/\partial x$ and mean pressures $\bar{P}_1$ and $\bar{P}_2$ as obtained by memory-holding the pressures $P_1$ and $P_2$, by an operation of $$\frac{\hat{x}}{l} = \frac{\bar{P}_2^{2(n-1)} a_{22} - \bar{P}_1^{n-1} \bar{P}_2^{n-1} a_{12}}{\bar{P}_1^{2(n-1)} a_{11} - 2\bar{P}_1^{n-1} \bar{P}_2^{n-1} a_{12} + \bar{P}_2^{2(n-1)} a_{22}}$$

wherein $$a_{ij} = E\left\{ \frac{\partial \tilde{P}i}{\partial x} \cdot \frac{\partial \tilde{P}j}{\partial x} \right\} \quad (i,j = 1, 2)$$

E: estimated value
$\hat{x}$: distance from upstream detector to leaking spot
n: pressure drop index number (n=1 for liquid, n=2 for isothermal gas and 1<n<2 for gas-liquid mixture which is determined experimentally depending upon the gas-liquid mixture ratio).

BRIEF DESCRIPTION OF THE DRAWINGS

The above and other objects, features and advantages of the invention will become apparent from the following description and the appended claim, taken in conjunction with the accompanying drawings which show by way of example one preferred embodimention of the present invention and in which:

FIGS. 3 to 5 are graphs showing the results of various experiments.

DESCRIPTION OF PREFERRED EMBODIMENT

Figure 1:
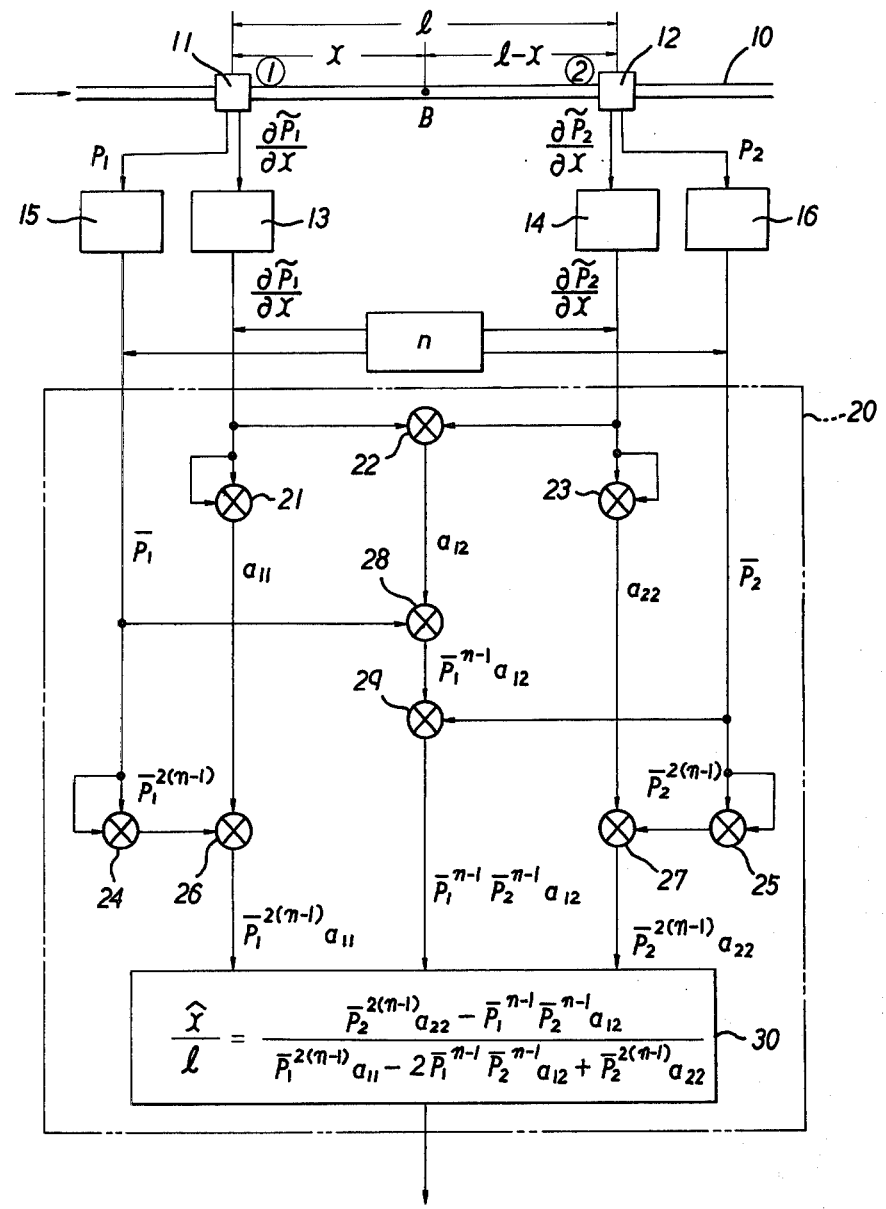
FIG. 1 is a block diagram of an estimating apparatus embodying the present invention.

Referring to FIG. 1, in a pipeline 10 of a predetermined diameter conveying a non-compressed liquid phase fluid or a compressed gas phase or gas-liquid two phase fluid, a leak of an isothermal fluid which is in steady flow at a relatively low velocity is expressed by the following equations.

$$P_{x1}^n = P_1^n + nP_1^{n-1} \frac{\partial P_1}{\partial x} \cdot x \quad (1)$$

$$P_{x2}^n = P_2^n - nP_2^{n-1} \frac{\partial P_2}{\partial x} \cdot (l - x)$$

wherein $P_1$ and $P_2$ are pressures at points 1 and 2 on the pipeline 10 spaced from each other by a given length $l$, $P_{x1}$ and $P_{x2}$ are pressures at a leaking point B as detected from the points 1 and 2 (spaced from upstream point 1 by a distance x), and n is a pressure drop index number which is n=1 for a liquid phase, n=2 for an isothermal gas fluid and a median value for a gas-liquid two phase which is determined experimentally depending upon the gas-liquid mixture ratio.

Since constantly $P_{x1} = P_{x2}$ due to the continuity of the pressure at point B, we can rewrite Equations (1) as follows.

$$n\left( P_1^{n-1} \frac{\partial P_1}{\partial x} - P_2^{n-1} \frac{\partial P_2}{\partial x} \right) \frac{x}{l} = \quad (2)$$

$$-\frac{P_1^n - P_2^n}{l} - nP_2^{n-1} \frac{\partial P_2}{\partial x}$$

Here, the deviations from the values in normal state are expressed by $$\frac{\partial P_1}{\partial x} = \Delta[P_0^n] + \frac{\partial \tilde{P}_1}{\partial x} \quad (3)$$

$$\frac{\partial P_2}{\partial x} = \Delta[P_0^n] = \frac{\partial \tilde{P}_2}{\partial x}$$

wherein P is the pressure in normal state and $\Delta[P_0{}^n]=P_{01}{}^n-P_{02}{}^n$ ($P_{01}$ and $P_{02}$ are the pressures at points 1 and 2 in normal state). Thus, from Equation (2) we obtain $$\left( \overline{P}_1{}^{n-1} \frac{\partial \widetilde{P}_1}{\partial x} - \overline{P}_2{}^{n-1} \frac{\partial \widetilde{P}_2}{\partial x} \right) \left( \frac{x}{l} \right) = -\overline{P}_2{}^{n-1} \frac{\partial \widetilde{P}_2}{\partial x} \tag{4}$$

wherein $\partial \tilde{P}_1/\partial x$ and $\partial \tilde{P}_2/\partial x$ are pressure gradients occurring at points 1 and 2 after normal state and $\overline{P}_1$ and $\overline{P}_2$ are mean pressures at points 1 and 2 in normal state.

From Equation (4), it is known that the locality of the leaking spot can be estimated by detecting the pressure gradients and mean pressures at points 1 and 2 of the pipeline 10. More particularly, detectors 11 and 12 are provided on the pipeline 10 at points 1 and 2 which are spaced from each other by a distance l, as shown in FIG. 1, thereby to detect the pressure gradients $\partial \tilde{P}_1/\partial x$ and $\partial \tilde{P}_2/\partial x$ and the pressures $P_1$ and $P_2$ for the estimation of the locality of leakage.

Figure 2:
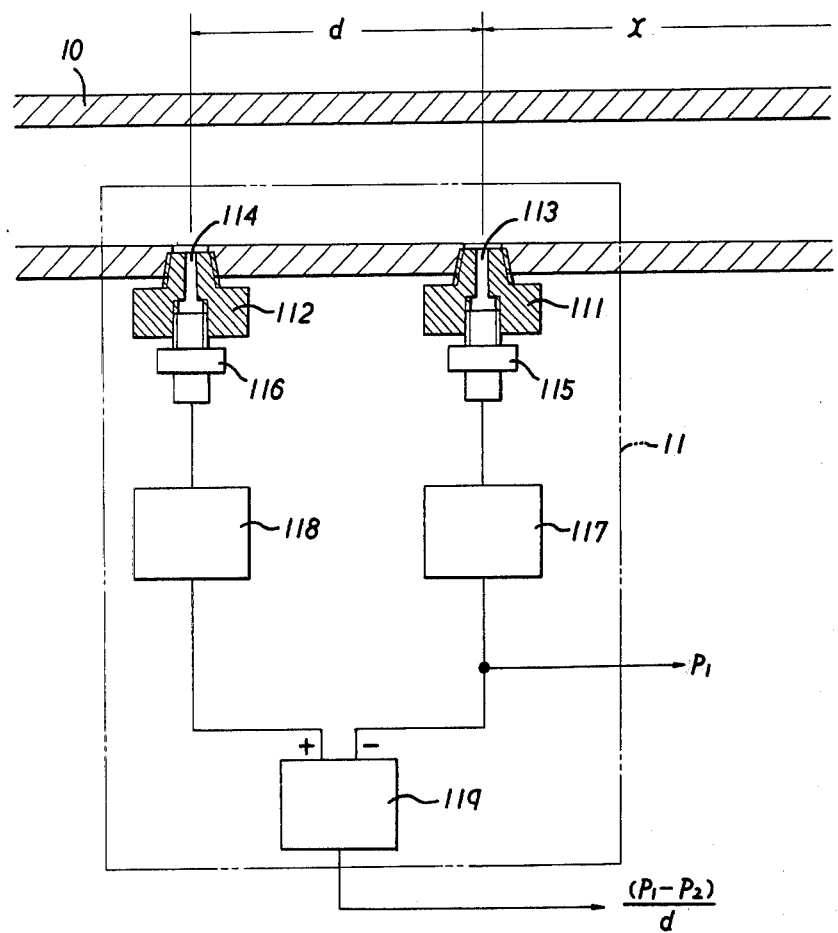
FIG. 2 is a diagrammatic view of detectors.

The detectors 11 and 12 may be arranged as shown particularly in FIG. 2 which illustrates the arrangement of the detector 11 at point 1 of the pipeline. The detector 11 includes terminal pieces 111 and 112 which are provided with inlets 113 and 114, respectively, in communication with the pipeline 10. Attached respectively to the terminal pieces 111 and 112 are pressure transducers 115 and 116 such as of strain or piezo type which are connected to a subtractor 119 through instrument amplifiers 117 and 118, respectively. The output of one pressure transducer 115 which is obtained through the instrument amplifier 117 is taken out as $P_1$ along with the output of the subtractor 119 which serves as the pressure gradient $(P_1-P_2)/d$.

When detecting the locality of leakage by the detectors 11 and 12 which are provided on the pipeline 10, it is necessary to eliminate the influence of irregular fluctuations in the values of $\partial \tilde{P}_1/\partial x$ and $\partial \tilde{P}_2/\partial x$ of the flowing fluids. In this regard, the present invention has experimentally confirmed that the locality of leakage is suitably calculated by the correlation $$\frac{\hat{x}}{l} = \frac{\overline{P}_2{}^{2(n-1)} a_{22} - \overline{P}_1{}^{n-1} \overline{P}_2{}^{n-1} a_{12}}{\overline{P}_1{}^{2(n-1)} a_{11} - 2\overline{P}_1{}^{n-1} \overline{P}_2{}^{n-1} a_{12} + \overline{P}_2{}^{2(n-1)} a_{22}} \tag{5}$$

wherein $$a_{ij} \equiv E\left\{ \frac{\partial \widetilde{P_i}}{\partial x} \cdot \frac{\partial \widetilde{P_j}}{\partial x} \right\} \quad (i,j = 1, 2)$$

E: estimated value
$\hat{x}$: estimated distance of leaking spot from upstream detector.

In order to perform these calculations, the detectors 11 and 12 which pick up the pressure gradients $\partial \tilde{P}_1/\partial x$ and $\partial \tilde{P}_2/\partial x$ and pressures $P_1$ and $P_2$ are connected to amplifiers 13 and 14 which amplify the respective pressure gradients and to pressure averaging circuits 15 and 16 which memory-hold the outputs $P_1$ and $P_2$ of the respective detectors to produce mean pressures $\overline{P}_1$ and $\overline{P}_2$. The outputs of the amplifiers 13 and 14 and averaging circuits 15 and 16 are fed to an operating unit 20 which is arranged to compute the locality of leakage according to Equation (5), along with a pressure drop index number n from an indexing unit 17. The pressure averaging circuits 15 and 16 may be adapted to remove pressure fluctuations by a filter or or to average by predetermined time periods the input signals which are converted into sequential digital signals.

The operating unit 20 includes multipliers 21 to 23 which produce outputs $a_{11}$, $a_{12}$ and $a_{22}$ on the basis of the values $\partial \tilde{P}_1/\partial x$ and $\partial \tilde{P}_2/\partial x$ from the amplifiers 13 and 14, multipliers 24 and 25 which produce outputs $\overline{P}_1{}^{2(n-1)}$ and $\overline{P}_2{}^{2(n-1)}$ on the basis of the outputs of the averaging circuits 15 and 16, multipliers 26 and 27 which multiply the outputs $a_{11}$ and $a_{22}$ of the multipliers 21 and 23 by $\overline{P}_1{}^{2(n-1)}$ and $\overline{P}_2{}^{2(n-1)}$, respectively, multipliers 28 and 29 which multiply the output $a_{12}$ of the multiplier 22 by $\overline{P}_1{}^{n-1}$ and $\overline{P}_2{}^{n-1}$, respectively, and a computing circuit 30 which performs the calculation of Equation (5) on the basis of the outputs of the multipliers 26, 27 and 29, namely, $\overline{P}_1{}^{2(n-1)} a_{11}$, $\overline{P}_1{}^{n-1}\overline{P}_2{}^{n-1} a_{12}$ and $\overline{P}_2{}^{2(n-1)} a_{22}$, the computing circuit 30 producing an output indicative of the estimated position of the leaking spot of the pipeline 10.

Prior to the above-described estimation of location of the leaking spot, it is necessary to detect the occurrence of leakage suitably by means of the detectors 11 and 12. Referring to FIG. 1, the relation between the pressure and flow rate of the fluid in the pipeline 10 without leakage is expressed by the following equation from Equation (1).

$$nP_1{}^{n-1} \frac{\partial P_1}{\partial x} - nP_2{}^{n-1} \frac{\partial P_2}{\partial x} = 0 \tag{6}$$

and therefore a leak is recognized when $D<0$ in the following equation $$D = nP_1{}^{n-1} \frac{\partial P_1}{\partial x} - nP_2{}^{n-1} \frac{\partial P_2}{\partial x} \tag{7}$$

In most pipelines, the temperature is not constant and often varies with a certain gradient. In such a case, the temperature variations are compensated by correcting the pressure drop index number n according to correction values which are experimentally determined in relation with temperature distribution. Practically, the pressure drop index number n is controlled in relation with the readings of a thermometer which is provided on the pipeline to measure the temperature of the running fluid.

Thus, the correlative method of the present invention is capable of estimating the location of a leak of a liquid, gas or gas-liquid phase flow with a high accuracy, as will be clear from the following experimental example.

Experiment 1

A pair of detectors were provided at points 1 and 2 on a nylon tube of 7.0 mm in inside diameter to have $x=1-x=5$ m and $d=2$ m. Air of 1.2 kg/cm$^2$ was passed through the tube at a flow rate of 2.27 l/sec, letting air leak at point B at a leaking flow rate of 33.5 cc/sec and leak ratio of 1.5%. The locality of the leaking spot was estimated by a leak locality estimating apparatus as shown in FIG. 1. The results are shown in FIG. 3.

Experiment 2

The locality of the leaking spot was estimated in the same manner as in Experiment 1 except the water and air of 1.13 kg/cm$^2$ were passed in mixed flow through the tube at 45.5 cc/sec and 31.6 cc/sec, respectively, letting the mixed fluid leak at point B with a leaking flow rate of 1.1 cc/sec and a leak ratio of 2.4%. The index number n in this case was 1.3. The results are shown in FIG. 4.

Experiment 3

Figure 5:
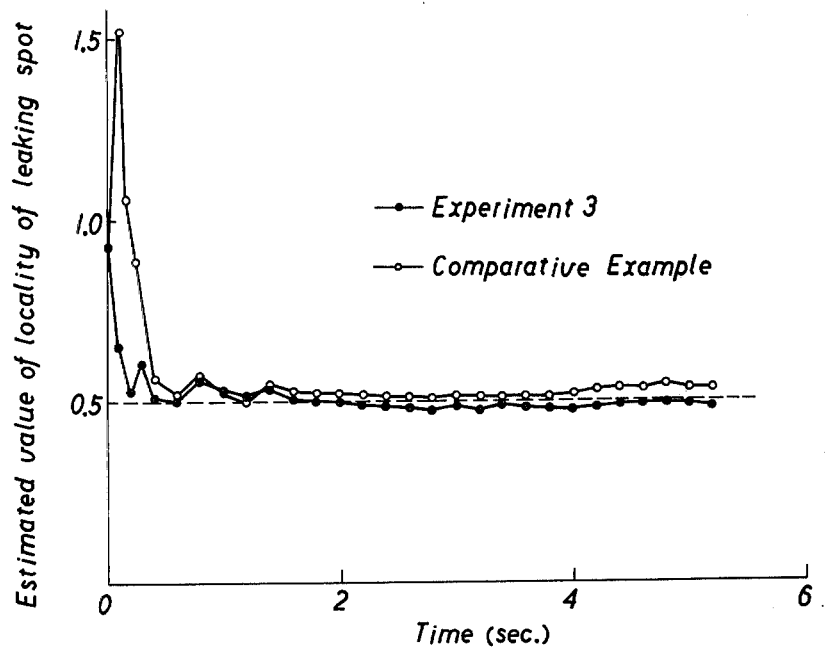

The locality of the leaking spot was estimated in the same manner as in Experiment 1 except that water was passed through the tube at a flow rate of 65.0 cc/sec, letting water leak at point B with a leaking flow rate of 1.1 cc/sec and a leak ratio of 1.7%. The results are shown in FIG. 5.

Comparative Example

The locality of the leaking spot was estimated in the same manner and under the same conditions as in Experiment except that the estimating apparatus of the invention was replaced by an apparatus which was adapted to calculate the locality by averaging operation according to $$\frac{\hat{x}}{l} = \frac{-a_2}{a_1 - a_2}$$

wherein $$a_i \equiv E\left\{\frac{\partial \widetilde{P_i}}{\partial x}\right\} \quad (i = 1, 2)$$

The results are shown in FIG. 5 in comparison with the counterparts of Experiment 3.

As clear from the results of experiments shown in FIGS. 3 to 5, the apparatus of the invention can estimate the locality of the leaking spot in an extremely stable and accurate manner.

It will be understood from the foregoing description that, according to the present invention, the locality of a leaking spot in a pipeline which conveys a flow of liquid phase, gas phase or gas-liquid two phase fluid is estimated easily by a simple apparatus in a stable and accurate manner. The estimating apparatus of the invention thus can be effectively used on various pipelines for locating the leaking spot upon occurrence of leakage of the conveyed fluid.

What is claimed is:

1. An apparatus for estimating the locality of a leaking spot in a pipeline which conveys a fluid, said apparatus comprising:

a pair of detectors located on said pipeline at positions spaced from each other by a given length l and adapted to detect pressures $P_1$ and $P_2$ and pressure gradients $\partial \widetilde{P}_1/\partial x$ and $\partial \widetilde{P}_2/\partial x$; and an operating unit adapted to calculate the locality of a leaking spot on the basis of said pressure gradients $\partial \widetilde{P}_1/\partial x$ and $\partial \widetilde{P}_2/\partial x$ and mean pressures $\bar{P}_1$ and $\bar{P}_2$ as obtained by memory-holding said pressures $P_1$ and $P_2$, respectively, by an operation of $$\frac{\hat{x}}{l} = \frac{\bar{P}_2^{2(n-1)} a_{22} - \bar{P}_1^{n-1}\bar{P}_2^{n-1} a_{12}}{\bar{P}_1^{2(n-1)} a_{11} - 2\bar{P}_1^{n-1}\bar{P}_2^{n-1} a_{12} + \bar{P}_2^{2(n-1)} a_{22}}$$

wherein $$a_{ij} \equiv E\left\{\frac{\partial \widetilde{P_i}}{\partial x} \cdot \frac{\partial \widetilde{P_j}}{\partial x}\right\} \quad (i,j = 1, 2)$$

E: estimated value
$\hat{x}$: distance from upstream detector to leaking spot
n: pressure drop index number (n=1 for liquid, n=2 for isothermal gas and 1<n<2 for gas-liquid mixture which is determined experimentally depending upon the gas-liquid mixture ratio).

* * * * *